(12) United States Patent
Fu

(10) Patent No.: US 7,321,566 B2
(45) Date of Patent: Jan. 22, 2008

(54) HIERARCHICAL MANAGEMENT SYSTEM ON DISTRIBUTED NETWORK MANAGEMENT PLATFORM

(75) Inventor: Gang Fu, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 715 days.

(21) Appl. No.: 10/487,666

(22) PCT Filed: Jun. 7, 2002

(86) PCT No.: PCT/CN02/00407

§ 371 (c)(1),
(2), (4) Date: Feb. 24, 2004

(87) PCT Pub. No.: WO03/058883

PCT Pub. Date: Jul. 17, 2003

(65) Prior Publication Data

US 2004/0196794 A1 Oct. 7, 2004

(30) Foreign Application Priority Data

Aug. 24, 2001 (CN) .............................. 01 1 30906

(51) Int. Cl.
*H04L 121/28* (2006.01)
(52) U.S. Cl. ...................................... 370/254; 709/201
(58) Field of Classification Search ................ 370/254, 370/255, 256, 257, 258; 709/201, 202, 203
See application file for complete search history.

(56) References Cited

U.S. PATENT DOCUMENTS 5,528,586 A * 6/1996 Ebert et al. .................. 370/419
5,586,254 A * 12/1996 Kondo et al. .................. 714/25

(Continued)

FOREIGN PATENT DOCUMENTS

CN 1269650 A 10/2000

(Continued)

OTHER PUBLICATIONS

Kar, G. et al.; "An Architecture for Managing Application Services over Global Networks"; Proceedings IEEE Infocom 2001; The Conference on Computer Communications; 20th Annual Joint Conference of the IEEE Computer and Communications Societies; Anchorage, AK; Apr. 22-26, 2001; Proceedings IEEE Infocom; The Conference on Computer Communications; vol. 1 of 3; Conf. 20; Apr. 22, 2001; pp. 1020-1027; XP010538790; ISBN: 0-7803-7016-3.

(Continued)

*Primary Examiner*—Ajit Patel

(57) ABSTRACT

The present invention relates to communication network technology, more particularly to a hierarchical network management system on a distributed network management platform. The system is a network management system with multi-layer structure. It can manage large scale network through hierarchical configuration of numerous network management stations and classification of the management domains. For instance, the system may include upper layer network management stations and lower layer network management stations, in which the upper layer network management station has the functions such as configuring and monitoring the lower layer network management stations with help of corresponding devices, while the lower layer network management station provides services of data collecting, reporting and monitoring for the network management via simple network management protocol (SNMP). The hierarchical management system is flexible and expandable, and can reduce network load caused by large scale network management, and improve management performance.

8 Claims, 3 Drawing Sheets

U.S. PATENT DOCUMENTS

| | | | |
|---|---|---|---|
| 5,651,006 A | | 7/1997 | Fujino et al. |
| 5,878,130 A | | 3/1999 | Andrews et al. |
| 6,035,331 A | * | 3/2000 | Soga et al. ............ 709/223 |
| 6,070,188 A | * | 5/2000 | Grant et al. ............ 709/223 |
| 6,370,571 B1 | * | 4/2002 | Medin, Jr. ............ 709/218 |
| 6,504,646 B1 | * | 1/2003 | Amoruso ............ 359/341.1 |
| 6,850,253 B1 | * | 2/2005 | Bazerman et al. ......... 715/734 |
| 6,898,630 B2 | * | 5/2005 | Ueno et al. ............ 709/223 |

FOREIGN PATENT DOCUMENTS

| | | | |
|---|---|---|---|
| WO | WO0014913 A2 | 3/2000 | |

OTHER PUBLICATIONS

Sloman, M; "Future Developments in Management of Distributed Systems"; Conference Proceedings Article; 1989; pp. 5-1; XP006525535.

Yugyung, Lee et al.; "Collaborative and Secure Resource Management with Distributed Agents"; Parallel and Distributed Systems; 2001; ICPADS 2001; Proceedings; Eighth International Conference on Jun. 26-29, 2001; Piscataway, NJ, USA; IEEE; Jun. 26, 2001; pp. 689-697; XP010551754; ISBN: 0-7695-1153-8.

* cited by examiner

HIERARCHICAL MANAGEMENT SYSTEM ON DISTRIBUTED NETWORK MANAGEMENT PLATFORM

CROSS REFERENCE TO RELATED APPLICATIONS

This application is a National Stage of International Application No. PCT/CN02/00407 filed Jun. 7, 2002 and published in Chinese on Jul. 17, 2003 as International Application No. WO 03/058883 A1. This application claims the benefit of Chinese Application No. 01130906.7 filed Aug. 24, 2001. The disclosure(s) of the above applications are incorporated herein by reference.

FIELD OF THE TECHNOLOGY

The present invention relates to communication network technology, and more particularly to a hierarchical management system on a distributed network management platform.

BACKGROUND OF THE INVENTION

Network management is a kind of very important and complicated technique in communication field. The prior network management technique is mostly based on centralized management mode in which a single network management station directly controls several network devices. The network management station accepts operating reports on alarming, configuring and data collecting of network devices and alike from different network devices. Generally, when the network is rather small, for instance Local Area Network (LAN), it is enough for network management and monitoring using centralized network management system. But when scope of the network is wide and the number of network devices is relatively larger, management capacity of the centralized network management system would be unable to meet requirements on network management and monitoring. The reason is that when a plurality of network devices send alarm information to the centralized network management station or the network management station collects data from network devices, the operation will inevitably occupy the network bandwidth, deplete network resources, and even make the network traffic jammed; secondly, in case of managing numerous network devices in relatively larger network, it is necessary for the centralized network management station to possess excellent ability of ensuring to solve the network problems timely and effectively; what is more, this capacity of the centralized network management station directly influences its management scope, making the system difficult to expand.

With the rapid development of network scale, the traditional network management system is unable to meet the requirements from large networks, thus, it is desirable to provide a new type of network management solution to make network management more flexible and expandable, reduce network load caused by network management, improve management performance, cut response time, satisfy the increasing requirements on network management, especially requirements on MAN and WAN.

SUMMARY OF THE INVENTION

It should be appreciated that the present invention provides a hierarchical management system on a distributed network management platform.

In a hierarchical management system on a distributed network management platform according to the invention, the network management stations are classified into upper layer network management stations and lower layer network management stations based on network domains respectively managed by the upper layer network management stations and lower layer network management stations, wherein one upper layer network management station is connected to a plurality of lower layer network management stations via a network management private network and network management agents, the upper layer network management station is configured to authorize the lower layer network management stations, determine network domains of lower layer network management stations so as to implement division of network domains and manage the lower layer network management stations and the network domains of lower layer network management stations via the lower layer network management stations;

the lower layer network management stations are configured to only manage the devices within their respective network domains, and provide information to their respective upper layer network management stations actively or passively.

The characteristics of the technical scheme according to the present invention is that, the hierarchical management system is a network management system with multi-layer structure, for instance, it may be a two-layer-structure network management system formed by upper layer network management station and lower layer network management station. Through hierarchical configuring of numerous network management stations and division of their management domains, management for a large scale network can be realized.

The main advantages of the present invention are as follows:

Easy to expand: adopting object orientated Management Information Base (MIB) definition style to determine available information from the lower layer network management station makes it easy to expand and edit, and suitable for different configure scenario of network management stations;

Easy to maintenance: agents may manage the network management stations with individual application without any influence for prior functions of the integrated network management platform; once the platform is updated, the operation can be achieved by modifying interior programs, keeping the outbound interface of the agents unchanged;

Easy to realize: because of relatively independence from the integrated network management platform, the agents can be installed on the platform, and when the system is in use, it is no need to make a good deal of modifications on the original integrated network management platform;

Easy to inherit: through taking network management stations as a private network device and adopting network management station-agent mode and SNMP protocol, the system may enjoy the management functions for SNMP devices which have been available in integrated network management platform.

DETAILED DESCRIPTION OF THE INVENTION

The present invention will be described in more detail hereinafter with reference to the accompanying drawings.

Figure 1:
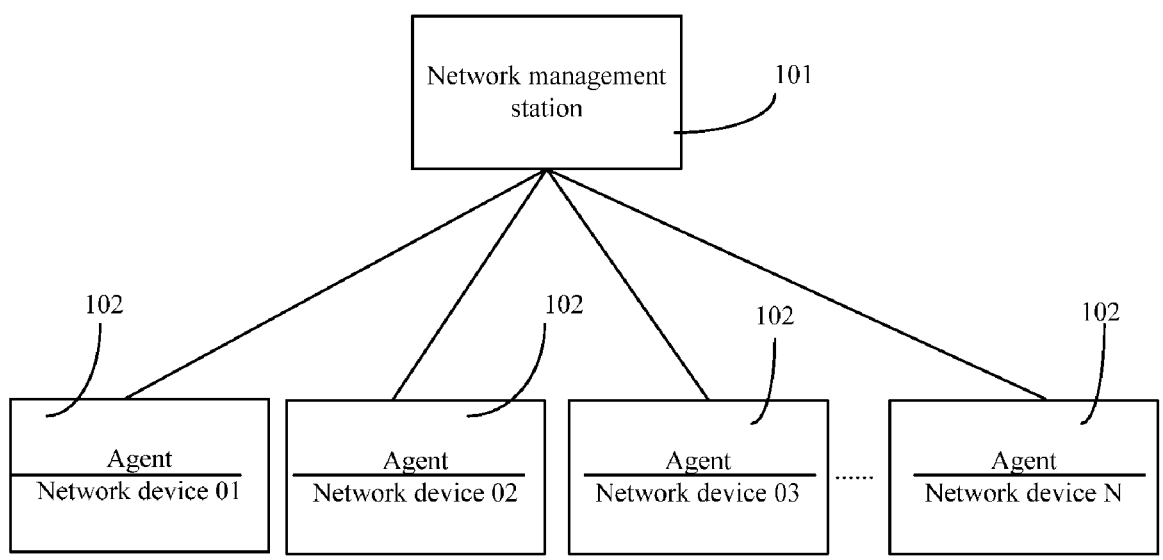
FIG. 1 is a schematic diagram of centralized network management system in prior art.

Referring to the centralized network management system in FIG. 1, a network management station 101 directly manages numerous network devices 102 with agent servers which include network device 01, network device 02 network device 03 . . . and network device N. The operations that are carried out by network management station 101 include receiving alarms and configure information from different network devices 102 and collecting data from the network devices.

Figure 2:
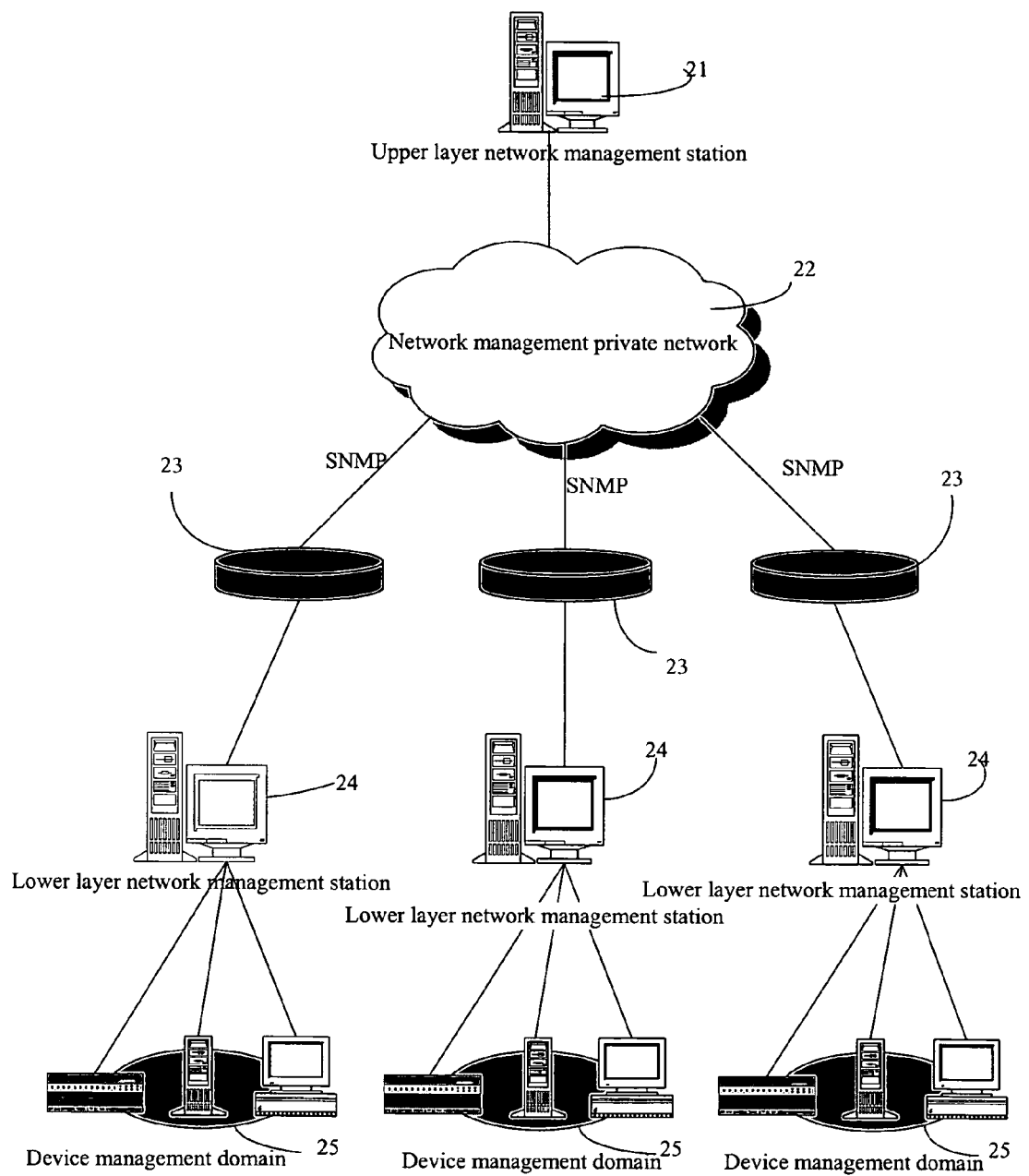
FIG. 2 is a schematic diagram of the hierarchical management system on a distributed network management platform in accordance with the present invention.

FIG. 2 illustrates a two-layer hierarchical management system on a distributed network management platform. As shown in the figure, an upper level network management station 21 in the hierarchical network management system is connected to agents 23 via a network management private network 22 operating simple network management protocol (SNMP). One agent 23 links a lower layer network management station 24 which directly manages its device management domain 25. The network management stations, including upper layer network management station and lower layer network management stations, are management servers with network management function, which are the foundation of the distributed network management system and used to manage the devices directly. The network management platform is realized by way of client/server mode. The server end is called network management server, and the server manages malfunction, performance, safety log of the network and network devices, as well as network management system itself. The network management client end monitors and controls the network system via the network management server. The client and the server can operate in different host computers, meanwhile, with help of the network management server, customer can employ the network management client to monitor and control the network system.

Different network management stations control different network domains which are a subset of all the network devices in the network. Generally speaking, a network management station may manage one network domain individually. There are two kinds of network domains in the present invention: direct management domain and management domain. Direct management domain is a collection of devices directly managed by a network management station, while management domain means a summation of the direct management domain and its lower layer network management station management domains controlled by the network management station.

As shown in FIG. 2, the network management stations of the hierarchical management system on a distributed network management platform are classified into two levels, namely upper layer network management station 21 and lower layer network management station 24. With help of network management private network 22, the upper layer network management station 21 is connected to the lower layer network management stations 24 via agents 23. The network management stations here refer to relatively independent network management systems constituting the hierarchical network management system. Different network management stations supervise different network domains, and the management domains of the lower layer network management stations are pointed by the upper layer network management station. However, lower layer network management station can not exceed its authority to manage other devices beyond its management domain. Besides, there are safety servers in the hierarchical network management system of distributed network management platform to control the management domains.

The upper layer network management station and lower layer network management stations above possess not only network management function on the integrated network management system, but also many other functions. The detailed function descriptions for the upper and lower layer network management stations 21 and 24 are as follows.

1. The functions of upper layer network management station 21 providing authorization to each lower layer network management station 24, determining management domains for each lower layer network management station 24, dividing management domains;

examining diagrams on topology structure of the lower layer network management stations 24;

managing the devices in management domains 25 of lower layer network management stations 24 directly; and through corresponding settings, receiving alarm information on devices and network management stations from the lower layer network management stations 24, and real time monitoring, recording and taking statistics for the information.

2. The functions of lower layer network management station 24 implementing the network management function for its device management domain 25 based on the authorization from the upper layer network management station 21; and providing information to the upper layer network management station 21 and carrying out orders of the upper layer network management station 21.

The hierarchical network management system above is an example with two-layer architecture, although the system can actually support interactive operations between multi-layer network management stations. The two-layer structure is enough for management in most cases, so all the description here is based on the two-layer hierarchical network management system.

Figure 3:
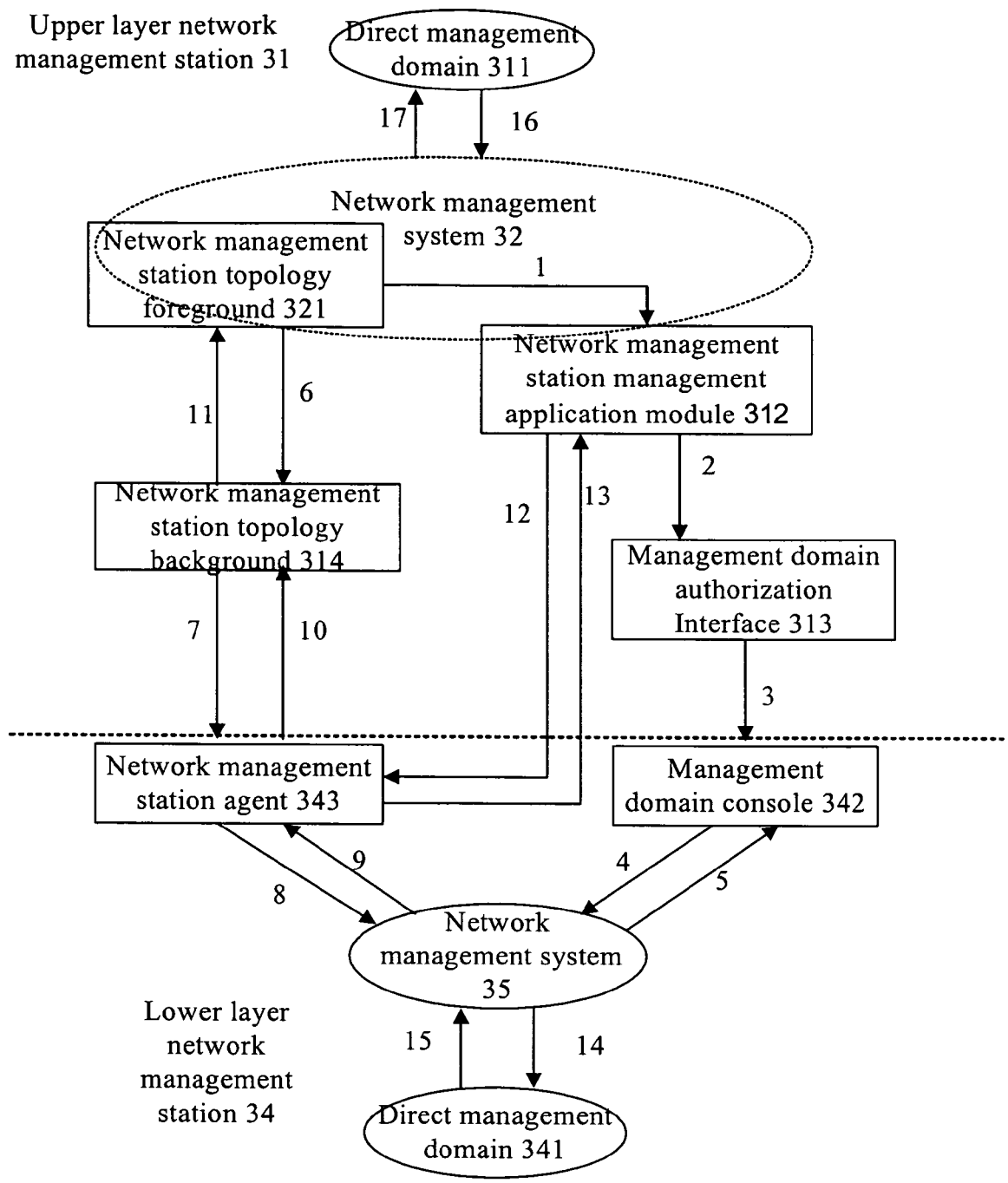
FIG. 3 is a schematic diagram for overall architecture of the hierarchical management system on a distributed network management platform in accordance with the present invention.

The invention will be described in more detail with reference to the specific embodiment as shown in FIG. 3.

FIG. 3 is a schematic diagram illustrating overall structure of a hierarchical management system on a distributed network management platform according to the present invention. In the embodiment, the system manages the network management stations as a type of private network devices in the network system. The upper layer network management station accomplishes functions such as configuring and monitoring the lower layer network management stations via the corresponding network management protocol. The upper layer network management station authorizes the lower layer network management stations through a network management station management application module, and appoints different device management domains for each of lower layer network management stations. The upper layer network management station visits agents of the lower layer network management stations via topology foreground/background, acquiring various data of the network devices in the management domains directly managed by lower layer network management stations. The agents of the lower layer network management stations operate the SNMP, and manage the functions such as collecting, monitoring and reporting of the network management station data, and provide data of the network devices in its direct management domains to the network management station management application module of the upper layer network management station. The communication protocol between the upper and lower layer network management stations adopts SNMP.

The hierarchical management system shown in the drawings includes two layers which are marked with dash line, upper layer network management station 31 and lower layer network management stations 34. Each layer of the network management stations have respective network management systems 32 and 35 which control their individual direct management domains.

The specific process in which the upper layer network management station 31 authorizes lower layer network management stations 34 and designates corresponding management domains comprises the following steps.

In step 1, the network management system 32 of the upper layer network management station 31 sends an activating signal to the network management station management application module 312 via network management station topology foreground 321.

In step 2, the upper layer network management station management application module 312 initiates management domain authorization interface 313.

In step 3, the management domain authorization interface 313 sends an authorization signal to a management domain console 342 of a lower layer network management station 34.

In step 4, the management domain console 342 sends a confirmation signal to the network management system 35 of the lower layer network management station 34 to ask validity checking for the authorization signal.

In step 5, if the authorization signal is valid, the network management system 35 will send a management domain identification signal to the management domain console 342, in this way, authorization and designation processes of lower layer network management station 34 made by upper layer network management station 31 can be completed.

The process in which the upper layer network management station 31 acquires data on the network devices in direct management domain 341 of a lower layer network management station 34 comprises the following steps.

In step 6, the upper layer network management station 31 sends an inquiry order to a network management station topology background 314 of the upper layer network management station 31 via the network management station topology foreground 321.

In step 7, the network management station topology background 314 of the upper layer network management station 31 sends an inquiry order to a network management station agent 343 of a lower layer network management station 34.

In step 8, the network management station agent 343 of the lower layer network management station 34 then sends an inquiry order to network management system 35 of the lower layer network management station 34.

In step 9, the network management system 35 of the lower layer network management station 34 returns the inquiry results to the network management station agent 343 of the lower layer network management station 34.

In step 10, the network management station agent 343 reports the inquiry results to the network management station topology background 314 of the upper layer network management station 31.

In step 11, the network management station topology background 314 reports the inquiry results to the network management station topology foreground 321 of the upper layer network management station 31, that is, reports the inquiry results to the network management system 32 of the upper layer network management station 31.

The process in which the upper layer network management station 31 acquires data on network management system 35 of lower layer network management station 34 comprises:

In step 12, the network management station management application module 312 of the upper layer network management station 31 sends an inquiry request to a network management station agent 343 of a lower layer network management station 34.

In step 13, after sending an inquiry request to the network management system 35 of the lower layer network management station 34 and receiving the results (step 8, step 9), the network management station agent 343 then reports the inquiry results to the upper network management system 32 through the network management station management application module 312.

In steps 14 and 15, the network management system 35 of the lower layer network management station 34 completes the operations such as searching, polling and data reporting for all devices in the direct management domain 341. And in steps 16 and 17, distributing and reporting of the information between the direct management domain 311 and the network management system 32 of the upper layer network management station 31 are implemented.

An advantage of the present invention is that hierarchical management on a distributed network management platform can improve management ability and reduce management workload. For instance, in a network management system which can control N devices, if the hierarchical management system on a distributed network management platform is adopted, then an upper layer network management station can manage N lower layer network management stations each of which in turn manages N devices, in other words, the whole hierarchical management system on a distributed network management platform can manage N×N devices. What is more, all the operations of searching and polling for the individual devices are completed by the lower layer network management stations, in this way, network load caused by large scale network management is greatly reduced. Moreover, this "plug-and-play" type hierarchical management mode makes network management more flexible, expandable and adjustable.

The invention claimed is:

1. A hierarchical management system on a distributed network management platform, comprising:
   network management stations, classified into upper layer network management stations and lower layer network management stations based on network domains respectively managed by the upper layer network management stations and lower layer network management stations, wherein
   one upper layer network management station is connected to a plurality of lower layer network management stations via a network management private network and network management agents, the upper layer network management station is configured to authorize the lower layer network management stations, determine network domains of lower layer network management stations so as to implement division of network domains and manage the lower layer network management stations and the network domains of lower layer network management stations via the lower layer network management stations;

the lower layer network management stations are configured to only manage the devices within their respective network domains, and provide information to their respective upper layer network management stations actively or passively.

2. The system according to claim 1, wherein each upper layer network management station has a network management system controlling its management domain and each lower layer network management station has a network management system controlling its direct management domain.

3. The system according to claim 1, wherein the upper layer network management station further comprises:

an upper layer network management station management application module and a management domain authorization interface, configured to authorize the lower layer network management stations and determine network domains of lower layer network management stations;

a network management station topology foreground and a network management station topology background, configured to visit the network management station agents of the lower layer network management stations so as to obtain various data of the network devices within direct management domains of the lower layer network management stations; and the upper layer network management station management application module is further configured to obtain various data of the network devices within the direct management domains of the lower layer network management stations through inquiring the lower layer network management station agents and the network management system of the lower layer network management stations.

4. The system according to claim 2, wherein said direct management domain is a collection of devices within the network domain directly managed by a network management station; and said management domain is a summation of all the devices within the direct management domain of a network management station and all network domains managed by the network management station.

5. The system according to claim 1, wherein one network domain is a subset of all network devices in the network, and one network management station is configured to manage one network domain individually.

6. The system according to claim 1, wherein said network management platform is implemented by a client/server mode; said server is a network management server with the functions of network management, the server is configured to manage performance, malfunction, safety, log of the network and network devices, as well as the network management system itself; said client end is configured to monitor and control network management system via the network management server.

7. The system according to claim 6, wherein said client end and said network management server are located in the same or different host computers.

8. The system according to claim 3, wherein said direct management domain is a collection of devices within the network domain directly managed by a network management station; and said management domain is a summation of all the devices within the direct management domain of a network management station and all network domains managed by the network management station.

* * * * *

UNITED STATES PATENT AND TRADEMARK OFFICE
CERTIFICATE OF CORRECTION

PATENT NO. : 7,321,566 B2 Page 1 of 1
APPLICATION NO. : 10/487666
DATED : January 22, 2008
INVENTOR(S) : Gang Fu It is certified that error appears in the above-identified patent and that said Letters Patent is hereby corrected as shown below:

Column 8, line 21, claim 7: After "control", insert --the--

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,321,566 B2  
APPLICATION NO. : 10/487666  
DATED : January 22, 2008  
INVENTOR(S) : Gang Fu Page 1 of 1

It is certified that error appears in the above-identified patent and that said Letters Patent is hereby corrected as shown below:

In the Specification

Column 3, Line 14, delete "02" and insert -- 02, --, therefor.

Column 6, Line 46, delete "type" and insert -- type of --, therefor.

Signed and Sealed this  
Sixth Day of September, 2022

Katherine Kelly Vidal  
*Director of the United States Patent and Trademark Office*